US005894374A

United States Patent [19]

Moraru

[11] Patent Number: 5,894,374
[45] Date of Patent: Apr. 13, 1999

[54] METHOD AND APPARATUS FOR PROVIDING A CLOCK ASSEMBLY

[75] Inventor: Alex Moraru, Fremont, Calif.

[73] Assignee: Phase Metrics, Inc., San Diego, Calif.

[21] Appl. No.: 08/768,558

[22] Filed: Dec. 17, 1996

[51] Int. Cl.[6] .................................................. G11B 5/48
[52] U.S. Cl. ............................................................ 360/75
[58] Field of Search .............................. 360/75, 51, 97.01, 360/97.02; 369/203, 216, 244, 245

[56] References Cited

U.S. PATENT DOCUMENTS

| | | | |
|---|---|---|---|
| 4,344,163 | 8/1982 | Madalinski | 369/245 X |
| 4,974,103 | 11/1990 | Iftikar et al. | 360/99.08 X |
| 4,980,783 | 12/1990 | Moir et al. | 360/75 X |
| 5,313,445 | 5/1994 | Wada et al. | 369/215 X |
| 5,404,492 | 4/1995 | Morara et al. | 395/500 |
| 5,448,429 | 9/1995 | Cribbs et al. | 360/51 |
| 5,760,989 | 6/1998 | Colban | 360/75 |

Primary Examiner—Aristotelis M. Psitos
Assistant Examiner—K. Wong
Attorney, Agent, or Firm—Blakely Sokoloff Taylor & Zafman

[57] ABSTRACT

The present invention is a clock head assembly that provides reference clock signals during servo writing of a magnetic disk in a hard drive. The clock head assembly includes a clock head that is pivotably mounted to a housing. The housing encloses a disk mounted to a spindle. The spindle is attached to the spindle motor of a hard disk drive through an opening in the housing. The spindle motor of the disk drive rotates the spindle and disk of the clock head assembly. The clock head is coupled to a cam that is manually actuated by a lever to move the clock head arm assembly between a loaded position and an unloaded position. During servo writing, the clock head is loaded onto the disk so that reference clock signals may be read from the disk and provided to a servo controller which utilizes the clock signals to write servo information onto the disk within the hard disk drive. Upon completion of servo writing, the clock head assembly is detached from the hard disk drive. The clock head assembly may be attached to the hard drive assembly in a non-clean room environment. In addition, the servo writing process may be conducted in a non-clean room environment.

13 Claims, 4 Drawing Sheets

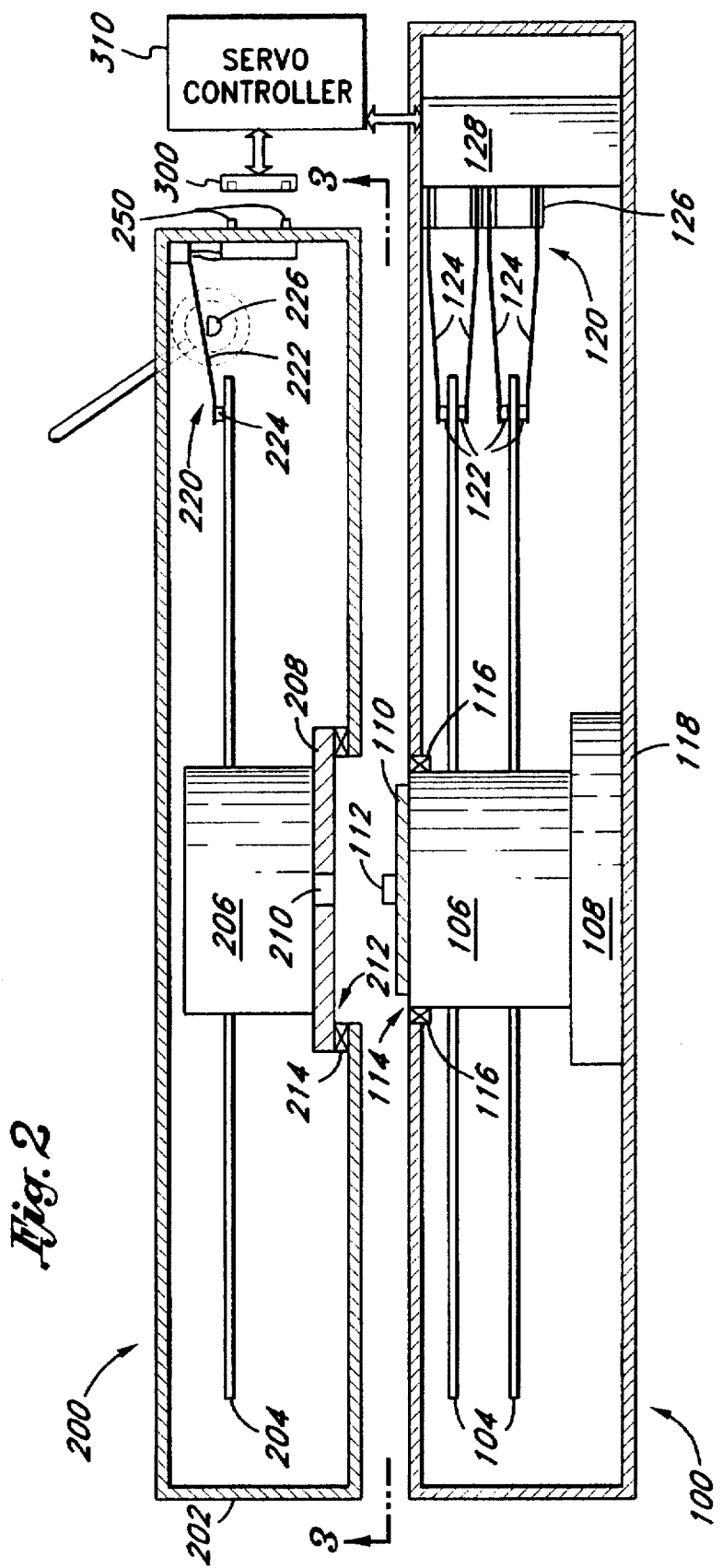

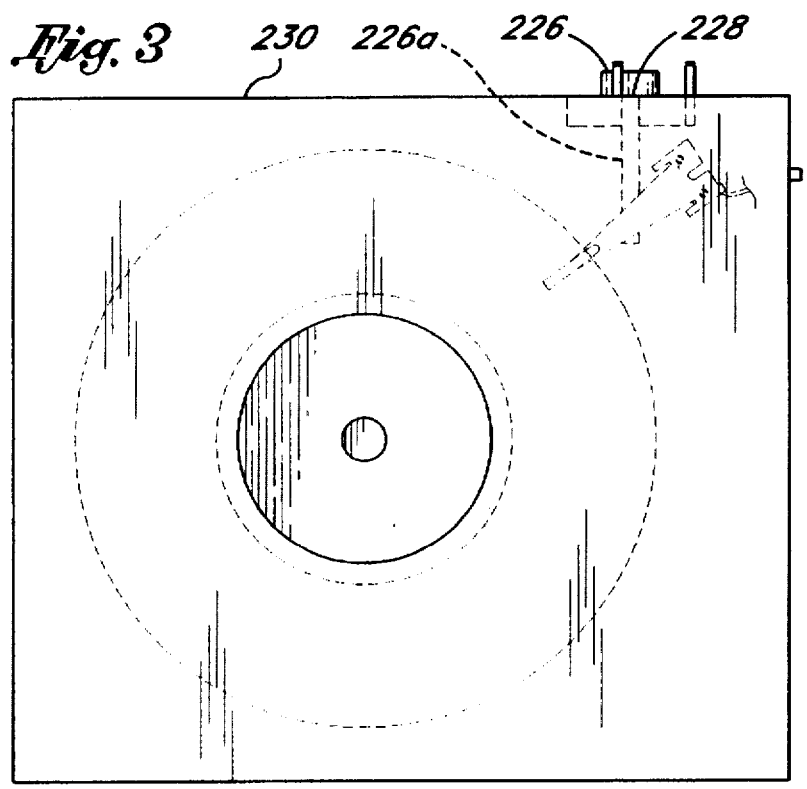
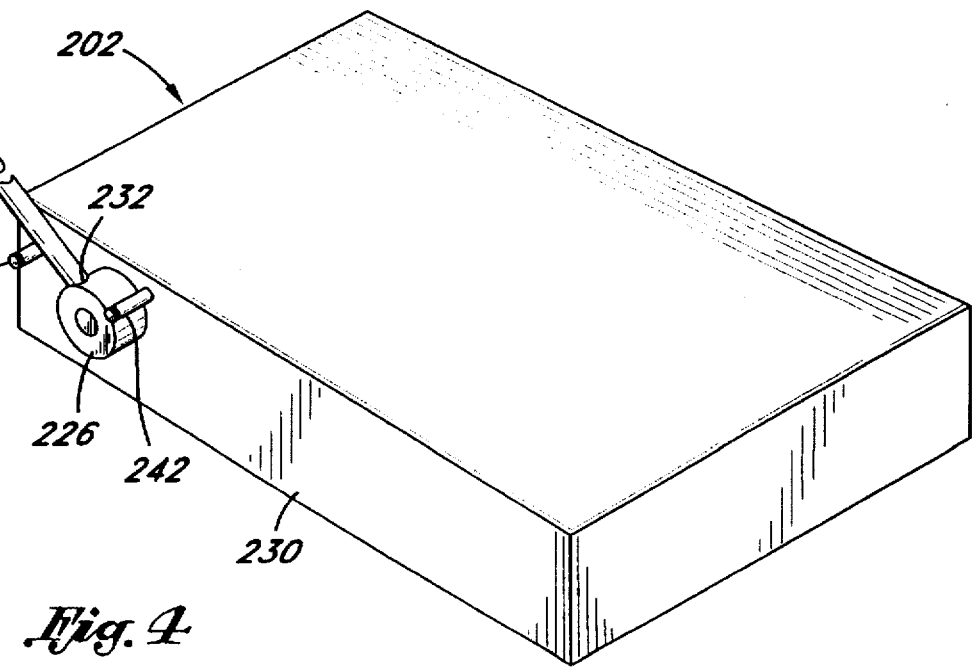

METHOD AND APPARATUS FOR PROVIDING A CLOCK ASSEMBLY

BACKGROUND OF THE INVENTION

1. Field of the Invention

The present invention relates in general to hard disk drives, and more particularly, to a method and apparatus of providing a portable, non-contact clock assembly which can be coupled to a hard disk drive so as to provide reference signals during servo writing.

2. Description of the Related Art

Disk drives are magnetic recording devices used for the storage of digital information. The digital information is recorded on concentric tracks on either surface of one or more magnetic recording disks. Each concentric track is divided into one or more sectors in which data is recorded.

In such magnetic recording devices, "marks" are used in establishing a reference point from which informational data may be detected. These marks include address marks which indicate the start of a sector in which digital data is recorded and synchronization pulses which facilitate synchronism between the internal clock of the disk drive and the speed at which the recording disk rotates.

Typically, before any information is recorded on the disks, sectors are established, to facilitate the orderly recording and reproduction of information. Prior to establishing these sectors, reference marks are written on the outermost track of the recording disks to provide reference points for the initial formatting of the disks. This is typically accomplished using a clock head assembly which is mounted on an assembly station.

FIG. 1 illustrates a conventional servo-track writing system 10, which positions the read/write heads in a magnetic disk drive 12 from a master drive assembly 14 located on an assembly station 16. The servo-track writing system 10 includes a master drive assembly 14 which includes a master arm 18 that is controlled by a master arm motor 20. The master arm 18 controls the movement of the hard drive arm 22 through the use of a mechanical push-pin 24.

To provide positional information for the read/write heads during servo writing, a master clock head assembly 26 located on the assembly station 16 embeds reference marks in the form of index bits on the outermost track of the disk. After writing the index bits, the master clock head assembly 26 verifies the validity of the index bits. During servo writing, the index bits are read by the master clock head assembly 26 and provided to a microprocessor-based servo controller 28. The servo controller 28 generates reference signals used in controlling the read/write heads mounted on the hard drive arm 22 via electronics 30 to perform a servo write routine.

The cover of the hard drive assembly 12 is removed prior to and during the process of servo writing so that the master arm 18 and the master clock head assembly 26 can be coupled to the hard drive arm 22 and the disk surface, respectively. This is typically accomplished in an open room environment. To ensure that dust or other contamination on the disk surface is minimized, the process of writing the reference marks and the process of servo writing must be conducted in a clean room, which is adequately equipped with filters to minimize contamination. Clean rooms are relatively expensive to build and maintain. In addition, personnel conducting the servo writing process must be fitted with appropriate clothing such as gowns, hoods and gloves to minimize the risk of contaminating the disks.

Furthermore, the reference mark writing process and the servo writing process are restricted to the assembly station 16 since the master clock head assembly 26 is mounted on the assembly station 16. Such typical servo writing processes are thus particularly cumbersome and expensive.

A more recent approach for providing such clock reference signals is disclosed in pending U.S. application Ser. No. 08/632,011, entitled "Method and Apparatus of providing a Captive Clock Head Assembly", filed Apr. 15, 1996, now U.S. Pat. No. 5,760,989, which is assigned to the assignee of the present invention. The captive clock head assembly includes a clock head that is mounted to an arm and coupled to the magnetic disk through a window of the disk drive housing. The arm is pivotably mounted to a housing which has a gasket that seals the window and allows the assembly to operate in a non-clean room environment. The arm is coupled to a cam that is manually actuated by a lever to move the clock head arm assembly between a loaded position and an unloaded position. An alignment plate is also provided for aligning the clock head assembly to the hard drive assembly. During servo writing, the captive clock head assembly is inserted into a slot on the side of the hard disk drive and activated to provide reference marks on the magnetic disk of the hard drive. The coupling of this captive clock head assembly onto the hard disk drive has to be conducted under a clean hood. Thereafter, servo writing may be conducted in a non-cleanroom environment.

Accordingly, there is a need in the technology for providing an apparatus and method for writing reference marks which is not restricted to an assembly station and which eliminates the need to utilize a clean room environment during assembly of the equipment or during the servo writing process.

BRIEF SUMMARY OF THE INVENTION

The present invention is a clock head assembly that provides reference clock signals during servo writing of a magnetic disk in a hard drive. The clock head assembly includes a clock head that is pivotably mounted to a housing. The housing encloses a disk mounted to a spindle. The spindle is attached to the spindle motor of a hard disk drive through an opening in the housing. The spindle motor of the disk drive rotates the spindle and disk of the clock head assembly. The clock head is coupled to a cam that is manually actuated by a lever to move the clock head arm assembly between a loaded position and an unloaded position. During servo writing, the clock head is loaded onto the disk so that reference clock signals may be read from the disk and provided to a servo controller which utilizes the clock signals to write servo information onto the disk within the hard disk drive. Upon completion of servo writing, the clock head assembly is detached from the hard disk drive. The clock head assembly may be attached to the hard drive assembly in a non-clean room environment. In addition, the servo writing process may be conducted in a non-clean room environment.

BRIEF DESCRIPTION OF THE DRAWINGS

FIG. 2 is a cross-sectional view of the clock assembly of the present invention, shown attached to a hard disk drive.

FIG. 3 is a bottom view of the clock assembly taken along line 3—3 of FIG. 2.

FIG. 4 is a perspective view of the clock assembly of the present invention.

DETAILED DESCRIPTION OF THE INVENTION

Figure 1:
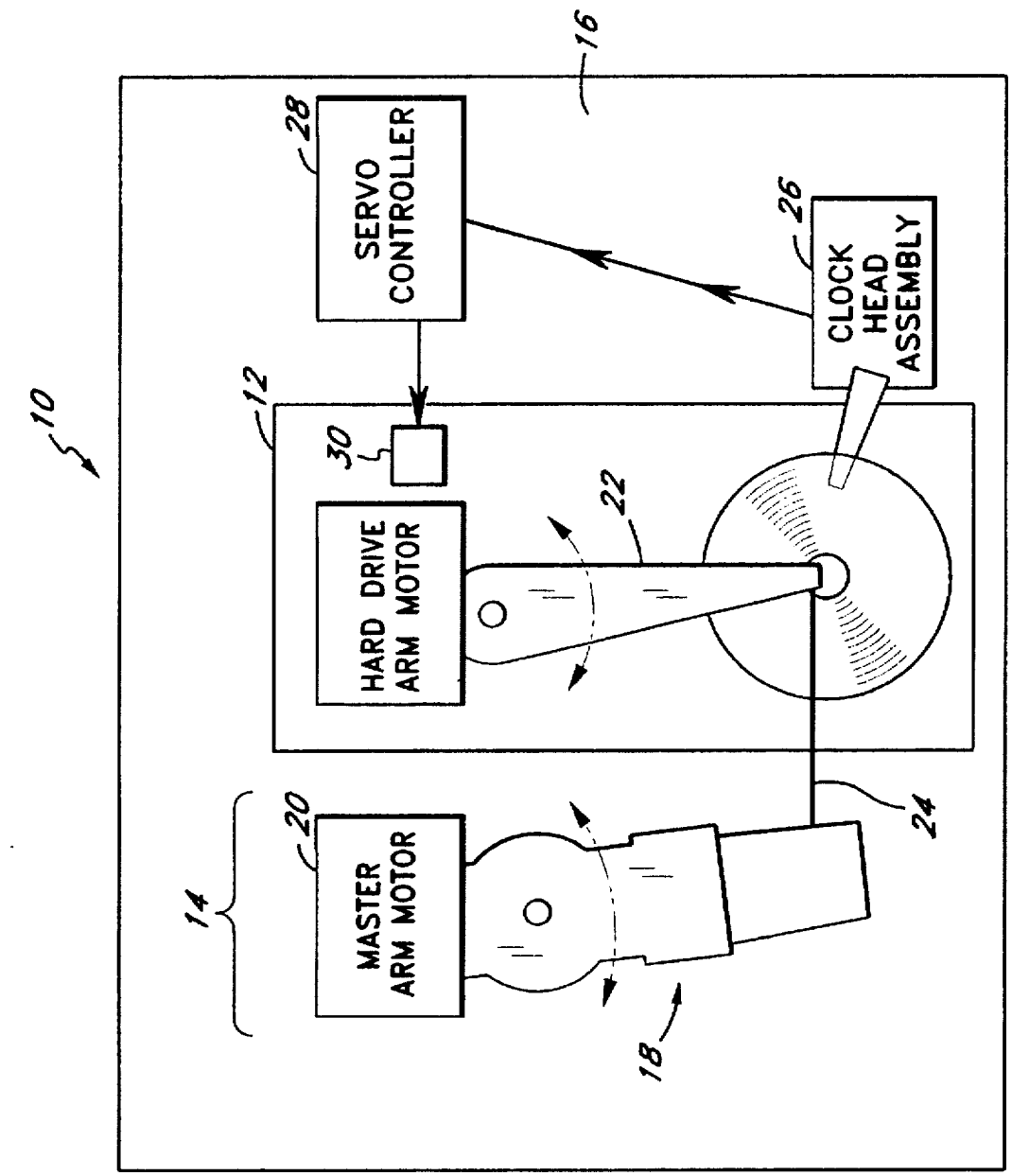
FIG. 1 is a schematic diagram of a disk drive assembly station of the prior art.

The present invention is a clock head assembly that provides reference clock signals during servo writing of a magnetic disk in a hard drive. The clock head assembly includes a clock head that is pivotably mounted to a housing. The housing encloses a disk mounted to a spindle that is attached to the spindle motor of a hard disk drive through an opening in the housing. The spindle motor of the disk drive rotates the spindle and disk of the clock head assembly. The clock head is coupled to a cam that is manually actuated by a lever to move the clock head arm assembly between a loaded position and an unloaded position. During servo writing, the clock head is loaded onto the disk so that reference clock signals may be read from the disk and provided to a servo controller which utilizes the clock signals to write servo information onto the disk within the hard disk drive. Upon completion of servo writing, the clock head assembly is detached from the hard disk drive.

With reference to the drawings, FIG. 2 is a perspective view of the clock assembly of the present invention, shown above a hard drive assembly that has a plurality of magnetic data storage disks. The hard drive assembly 100 is enclosed within a housing 102 and includes a plurality of disks 104 that are mounted on a spindle 106 which is rotated by a spin motor 108. The spindle 106 includes a hub 110 that has a cap 112. In one embodiment, the hub 110 is made from a magnetic material. The hub 108 is exposed to the exterior of the housing 102 through an opening 114 in the housing 102. The hard drive assembly 100 is, however, sealed through the use of bearings 116 mounted to the periphery of the opening 114 and coupled to the spindle 106. The spin motor 108 is mounted to a base plate 118 of the housing 102. Also mounted to the base plate 118 is an actuator arm assembly 120. The actuator arm assembly 120 includes a number of heads 122 mounted to corresponding flexure arms 124. The flexure arms 124 are attached to an actuator arm 126 that can rotate about a bearing assembly. The assembly 120 also contains a voice coil motor 128 which moves the heads 122 relative to the disks 102. There is typically a single head for each disk surface. The spin motor 106, voice coil motor 128 and the heads 122 are coupled to and controlled by a number of electronic circuits mounted to a printed circuit board (not shown).

The clock assembly 200 comprises a housing 202 that rests on the hard drive assembly 100. In one embodiment, the clock assembly 200 is provided as a cartridge which can simply be coupled to the hard drive assembly 100 during the servo writing process. The clock assembly 200 includes a disk 204 that is mounted on a spindle 206. The base of the spindle 206 has a hub 208 with a socket 210. In one embodiment, the hub 208 is made of steel. The hub 208 is exposed to the exterior of the housing 202 through an opening 212 in the housing 202. The hub 208 is coupled to a bearing 214 that allows relative movement between spindle 206 and the housing 202.

Prior to the servo writing process, the spindle 206 of the clock assembly 200 is coupled to the spindle 106 of the hard drive assembly 100 by coupling the hub 208 of the clock head assembly 200 to the hub 110 of the hard drive assembly 100. The socket 210 of the hub 208 in the clock assembly 200 receives the cap 112 of the hub 110 in the hard drive assembly 100, and the hub 208 is then magnetically coupled to the hub 110. In this manner, during the servo writing process, the spindle 206 of the clock assembly 200 will be rotating at the same speed as the spindle 106 of the hard drive assembly 100.

Figure 5A:
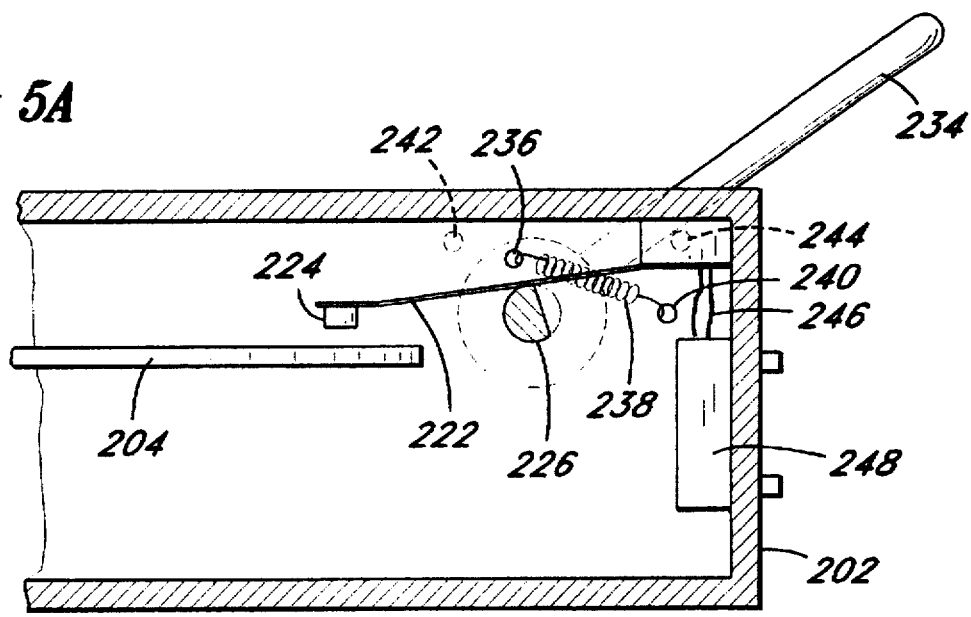
FIG. 5A is a cross-sectional view of the clock assembly shown with its lever arm in an unloaded position.
Figure 5B:
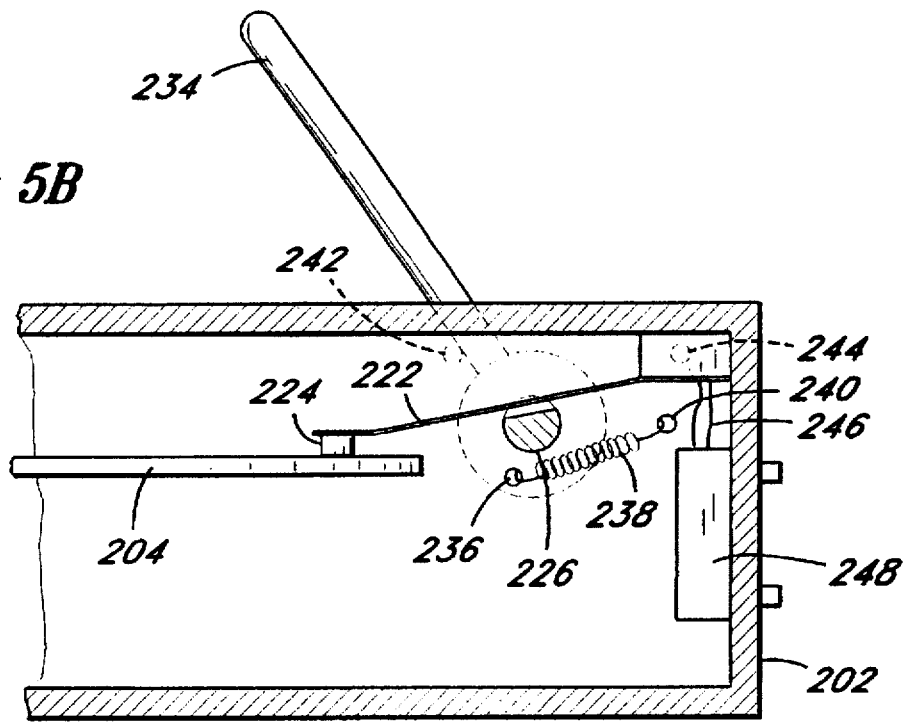
FIG. 5B is a cross-sectional view of the clock assembly shown with its lever arm in a loaded position.

As shown in FIGS. 2 and 3, the clock assembly 100 further comprises a clock head arm assembly 220 that is pivotably mounted on the inside surface of the housing 202. The clock head arm assembly 220 comprises a flexure arm 222 and a clock head 224. The flexure arm 222 rests on a cam 226 mounted through an aperture 228 (see FIG. 3) located on the side wall 230 of the housing 202. Located on the cam 226 is a mounting hole 232 (see FIG. 4), which receives a lever arm 234, as shown in FIGS. 5A and 5B, the cam 226 further includes a pin 236 which is connected to one end of a spring 238. The other end of the spring 238 is connected to another pin 240 mounted on the inner surface of the side wall 230. Also located on the side wall 230 are two position pins 242 and 244 for restricting movement of the lever arm 234. The clock head assembly 220 is coupled to a preamplifier 248 via signal line 246. The preamplifier 248 is connected to a number of contacts 250 mounted on the exterior of housing 202. Reading and writing of reference marks in the form of index bits by the clock head 224 is performed under the control of an external electronic assembly 300 (see FIG. 2), which is coupled to the clock head assembly 220 via contacts 250. The electronic assembly 300 operates under the control of a servo controller 310 (see FIG. 2), which is also coupled to the hard drive assembly 100.

The lever arm 234 may be rotated from a first position to a second position, thereby lifting the clock head 224 of the clock head arm assembly 220 from an unloaded to a loaded position. When the lever arm 234 is rotated backwards, as shown in FIG. 5A, it reaches a first position where it rests against the position pin 244. In this first position, the lever arm 234 is held in place by the tension in the spring 238. In addition, the head 224 of the clock head assembly 220 is unloaded, i.e., lifted to a position above the surface of the disk 204 by the cylindrical portion 226a (see FIG. 3) of the cam 226. When the lever arm 234 is rotated forward, as shown in FIG. 5B, it reaches a second position where it rests against the position pin 242. In this position, the lever arm 234 is also held in place by the tension in the spring 238. When the lever arm 234 is rotated to the second position, the clock head 224 is loaded onto the surface of the disk 204, as shown in FIG. 5B.

When the clock head 224 is loaded onto the disk 204, writing of the index bits on the disk 204 may begin. When the writing of the index bits is completed, the clock head 224 reads and verifies the index bits written on the disk 204. When thus verified, servo writing may begin. When the servo writing process is completed, the clock head assembly 200 may be decoupled from the hard disk drive 100.

By using the clock head assembly of the present invention, a clock head arm assembly can coupled to a hard disk drive without the use of a clean hood during the assembly process. The use of the clock head assembly of the present invention also eliminates the need for the reference mark writing process to be restricted to an assembly station.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A clock head assembly for providing a clock signal for a drive disk of a hard disk drive, the drive disk mounted on, a drive spindle that is coupled to a spindle motor, the drive spindle having a hard disk drive hub that is exposed to an exterior of a sealed hard disk drive housing that seals the hard disk drive, the clock head assembly comprising:

a clock head assembly housing positioned outside the sealed hard disk drive housing;

a spindle of the clock head assembly located within said clock head assembly housing, said spindle to couple to the hard disk drive hub;

a disk that contains a clock signal and is mounted to the spindle of the clock head assembly; and a clock head coupled to said clock head assembly housing, the clock head reads said clock signal from said disk.

2. The assembly of claim 1, further comprising a lever that is attached to a cam, said cam being coupled to said clock head so that said clock head moves from a first position to a second position when said lever is rotated.

3. The assembly of claim 2, wherein the spindle of the clock head assembly is coupled to a spindle hub that is coupled to the hard disk drive hub.

4. The assembly of claim 3, wherein said clock head assembly housing has an opening which exposes said spindle hub.

5. The assembly of claim 3, wherein the spindle hub is magnetically coupled to the hard disk drive hub.

6. The assembly of claim 1, further comprising a circuit coupled to the clock head for controlling reading and writing of reference marks by the clock head.

7. A method for providing clock signals for a drive disk of a hard disk drive having a drive spindle that is coupled to a spindle motor, the drive spindle having a hub that is exposed to the exterior of a sealed hard disk drive housing, comprising:

(a) providing a clock head assembly having a spindle located within a clock head assembly housing, a clock disk that is mounted on the spindle; and a clock head that is coupled to said housing; and (b) coupling the spindle of the clock head assembly to the hub of the drive spindle.

8. The method of claim 7, further comprising:

(c) spinning the disk;

(d) loading the clock head onto the disk; and (e) reading a plurality of clock signals located on the disk.

9. The method of claim 7, further comprising:

moving the clock head from an unloaded position to a loaded position.

10. The method of claim 7, wherein the spindle of the clock head assembly has a spindle hub, and wherein the spindle hub is magnetically coupled to the hub of the hard drive assembly.

11. The method of claim 8, further comprising:

(f) writing servo signals on the drive disk with reference to the clock signals; and (e) uncoupling said spindle hub from the spindle upon completion of step (f).

12. A system for writing a clock signal comprising:

a hard disk drive including a first disk mounted on a first spindle, the first disk and the first spindle sealed inside a first sealed housing;

a first hub coupled to the first spindle, the first hub exposed outside of the sealed housing; and a clock head assembly including a second disk mounted on a second spindle, the second disk and the second spindle encased inside a second housing, the second spindle including a coupling mechanism to couple the second spindle to the first hub.

13. The system of claim 12 wherein:

a clock signal written on the second disk is used to write a clock signal on the first disk.

* * * * *